United States Patent [19]
Nishikawa

[11] 4,257,989
[45] Mar. 24, 1981

[54] HUMIDIFIER

[75] Inventor: Kyoichi Nishikawa, Tokyo, Japan

[73] Assignee: TDK Electronics Co., Ltd., Tokyo, Japan

[21] Appl. No.: 13,904

[22] Filed: Feb. 22, 1979

[51] Int. Cl.³ ............................................... B01F 3/04
[52] U.S. Cl. ........................................ 261/4; 210/282; 210/287; 261/1; 261/66; 261/81; 261/DIG. 46; 261/DIG. 48
[58] Field of Search ............ 261/1, 3, 4, 81, DIG. 15, 261/DIG. 46, DIG. 48, 119 R, 66; 210/25, 38 A, 282, 287

[56] References Cited

U.S. PATENT DOCUMENTS

| | | | |
|---|---|---|---|
| 2,749,307 | 6/1956 | Ellison | 210/25 X |
| 3,291,117 | 12/1966 | Shenkin | 261/DIG. 15 |
| 3,325,976 | 6/1967 | West | 261/1 X |
| 3,776,530 | 12/1973 | Griffith et al. | 261/4 |
| 3,897,213 | 7/1975 | Stevens et al. | 210/25 X |
| 3,964,999 | 6/1976 | Chisdes | 210/25 X |
| 4,031,171 | 6/1977 | Asao et al. | 261/1 |

Primary Examiner—Richard L. Chiesa
Attorney, Agent, or Firm—Oblon, Fisher, Spivak, McClelland & Maier

[57] ABSTRACT

A humidifier including a misting mechanism for misting water by a ultrasonic vibrator etc. and a water feeder formed by a water storage tank and a water passage and an ion exchange resin layer disposed in the water passage to the misting mechanism.

6 Claims, 14 Drawing Figures

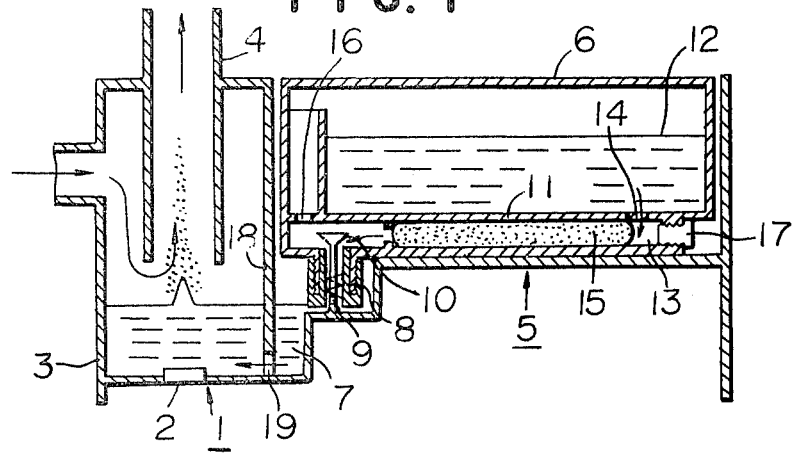
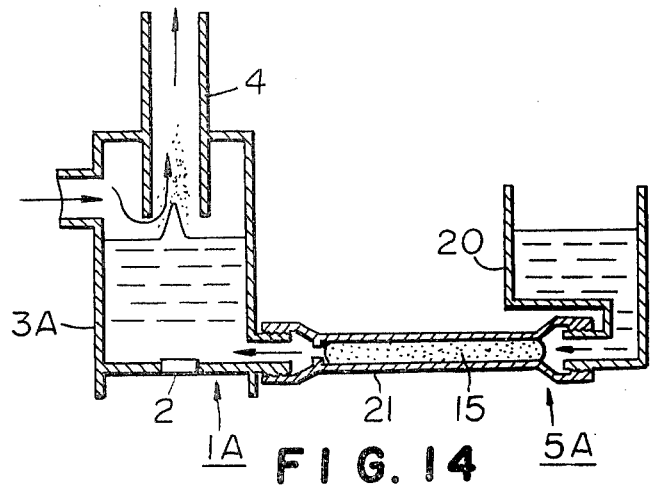
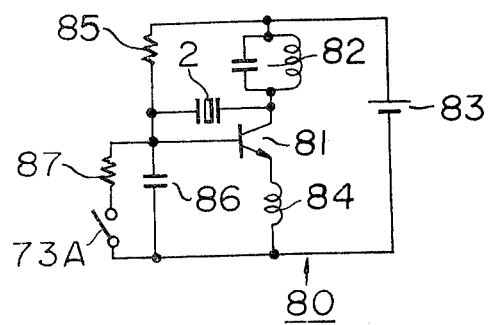

HUMIDIFIER

BACKGROUND OF THE INVENTION

1. Field of the Invention

The present invention relates to a ultrasonic type or spraying type humidifier which forms mist by a mechanical method.

2. Description of the Prior Arts

In general, city water or well water as natural water contains impurities such as calcium, magnesium and sodium components.

When such water containing impurities is used in the conventional ultrasonic type or spraying type humidifier, water containing the impurities such as calcium, magnesium and sodium components is misted whereby the water is evaporated after forming the mist to retain impurities as dust which may be allowed to float in the room in which the humidification is carried out and may be deposited on wall or equipments in the room.

SUMMARY OF THE INVENTION

It is an object of the present invention to provide a humidifier which prevents formation of dust remaining by evaporating water from mist which is mechanically formed by a misting mechanism.

It is another object of the present invention to provide a humidifier which prevents formation of an acidic or basic mist.

It is a further object of the present invention to provide a humidifier which prevents formation of dust or an acidic or basic mist by using an ion exchange resin layer whose life is detected to secure the effect.

The foregoing and other objects of the present invention will be apparent from the detailed description referring to the drawings.

BRIEF DESCRIPTION OF THE DRAWINGS

FIG. 1 is a sectional schematic view of the first embodiment of a humidifier according to the present invention;

FIG. 3 is a sectional schematic view of the second embodiment of the humidifier;

FIG. 14 is a circuit diagram of one embodiment of a vibrator driving circuit used in the seventh embodiment of the humidifier.

Figure 2:
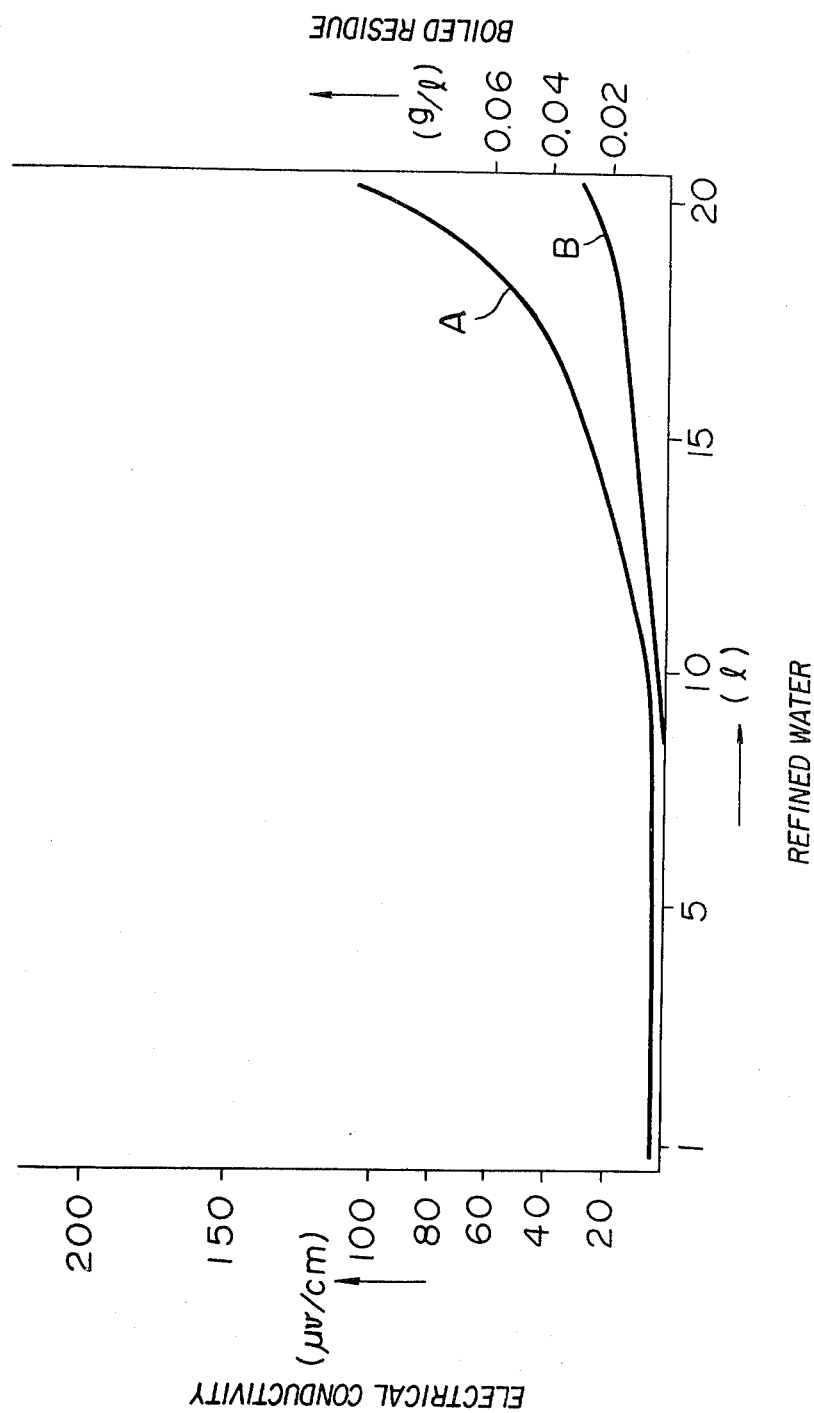
FIG. 2 is a graph illustrating activity of an ion exchange resin.

DETAILED DESCRIPTION OF THE PREFERRED EMBODIMENTS:

FIG. 1 shows one embodiment of a humidifier of the present invention.

In FIG. 1, a misting mechanism (1) comprises a ultrasonic vibrator (2), a misting container (3) and a mist conduit (4). A water feeder (5) for supplying water to the misting mechanism (1) comprises a detachable tank (6) and a vessel (7). The detachable tank (6) has an opening at the bottom and a plug (8) having a valve is screwed at the opening. In the plug (8) having a valve, the valve (10) is pushed down to be opened by a projection (9) formed at the position putting the vessel (7) when the detachable tank (6) is disposed at the predetermined position. A partition (11) is formed in the detachable tank (6) to separate the water storage chamber (12) from a thin ion exchange chamber (13) along the bottom. The water storage chamber (12) is communicated to the ion exchange chamber (13) through a hole (14) formed on the partition (11) and a bag type ion exchange resin layer (15) packed in a water permeable bag is disposed in the ion exchange chamber (13). An air discharge hole (16) is formed on the partition (11). An opening for exchanging the ion exchange resin layer (15) is formed at the side wall of the ion exchange chamber (13) and a cap (17) is screwed at the opening. The vessel (7) is communicated to the misting container (3) through a hole (19) formed on the partition (18).

In the embodiment, when the plug (8) having the valve is taken out and water is poured into the detachable tank (6) and then, the plug (8) is screwed to arrange the tank (6) as shown in FIG. 1, the valve (10) is pushed open to pass water from the water storage chamber (12) through the hole (14) into the ion exchange chamber (13) and water is passed through the ion exchange resin layer (15) and the plug (8) into the vessel (7). Thus, water is passed through the hole (19) into the misting container (3) and is misted by the ultrasonic vibrator (2) to discharge the mist through the mist conduit (4). In this operation, water fed into the misting container (3) is passed through the ion exchange resin layer (15) whereby most of impurities such as calcium, magnesium and sodium components contained in city water or well water are substantially removed to prevent a pollution with the impurities in a room for humidifying.

FIG. 2 shows the relation of electric conductivity ($\mu\Omega$/cm) and boiled residue (g/liter) to volume of refined water (liter) obtained by passing city water through 200 cc of an ion exchange resin layer at a flow rate of 100 cc/min.

The flow rate of water in the humidifier is usually far smaller than 100 cc/min. and the volume of water refined by the ion exchange resin is only several liters even though the humidifier is used for a long time. As shown in FIG. 2, the electric conductivity and the boiled residue are usually quite lower than those of city water (conductivity of 260 $\mu\Omega$/cm; boiled residue of 0.158 g/liter). This is remarkable improvement.

As described above, in accordance with the embodiment, natural or city water is refined by the ion exchange resin layer (15) to obtain a deionized water or a pure water and the mist is formed with it to prevent formation of dust.

The bag type ion exchange resin layer (15) can be exchanged by taking the cap (17) of the detachable tank (6) and maintenance is easily attained.

FIG. 3 shows the second embodiment wherein the misting mechanism (1A) comprises the ultrasonic vibrator (2), the misting container (3A) and the mist conduit (4). The water feeder (5A) for supplying water to the misting mechanism (1A) comprises a water storage tank (20) and a column (21) for connecting the tank (20) to the misting container (3A). The bag type ion exchange resin layer (15) packed in a water permeable bag is disposed in the column (21). A screw is formed at the end of the column (21) so as to screw the opening of the misting container (3A) with the opening of the water storage tank (20).

In accordance with the second embodiment, water is passed from the water storage tank (20) through the ion exchange resin layer (15) into the misting container (3A) whereby the same effect of the first embodiment is attained. The ion exchange resin layer (15) can be exchageable by disassembling the column (21).

Figure 4:
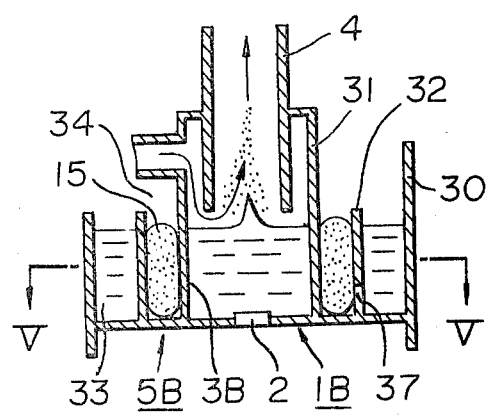
FIGS. 4 and 5 are respectively sectional side and plan views of the third embodiment of the humidifier.
Figure 5:
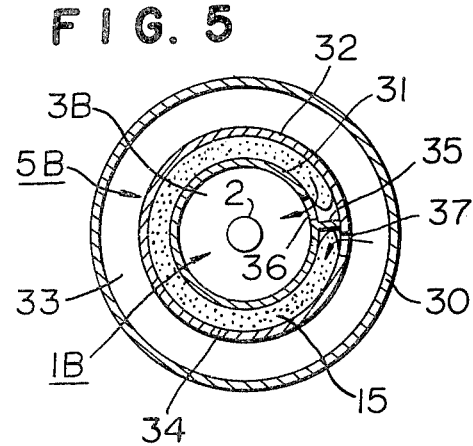

FIGS. 4 and 5 show the third embodiment of the humidifier of the present invention.

In FIGS. 4 and 5, the first cylindrical partition (31) is formed in the container (30) and the second cylindrical partition (32) is formed at the outer side. The misting mechanism (1B) comprises the ultrasonic vibrator (2), the misting container (3B) formed by the bottom having the vibrator (2) and the first partition (31) and the mist conduit (4). The water feed part (5B) for supply water to the misting mechanism (1B) comprises a water storage tank (33) formed by the side wall of the container (30) and the second partition (32) and the water feed passage (34) formed by the first and second partitions (31), 32. The third partition (35) is formed in the water feed passage (34) and the bag type ion exchange resin layer (15) is disposed in the water feed pass (34) and holes (36), (37) are respectively formed on the first and second partitions (31), (32).

In accordance with the third embodiment, water in the water storage tank (33) is fed through the hole (37) into the annular water feed passage (34), the ion exchange resin layer (15) and the hole (36) into the misting container (3B) whereby water used for misting in the misting mechanism (1B) is treated to become deionized water or pure water and the same effect of the first embodiment is attained. The ion exchange resin layer (15) can be easily carried out because the upper part of the water feed passage (34) is opened.

The place of the ion exchange resin layer can be the other parts, beside those of the embodiments, and is a water passage to the misting mechanism.

As the misting mechanism, an ultrasonic vibrator type one has been used, however, this can be applied to a spraying mechanism.

As described above, in accordance with the present invention, the ion exchange resin layer is disposed in a water feed passage and water is passed through it to obtain deionized water or pure water and the deionized water or the pure water is misted to prevent formation of dust.

A large volume such as more than 20 liter of water is treated by the ion exchange resin layer and the electric conductivity and the boiled residue are suddenly increased to loose the effect of the ion exchange resin. When the life of the cation exchange resin is different from the life of the anion exchange resin, only one cation or anion is exchanged to cause an acidic or a basic condition of water. Accordingly, it is preferable to exchange to ion exchange resin layer before losing life from the viewpoint of prevention of dust and prevention of an acidic or basic mist.

Figure 6:
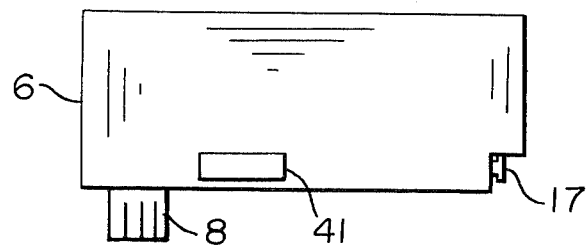
FIGS. 6 and 7 are respectively schematic views of the outer appearance of the humidifier.
Figure 7:
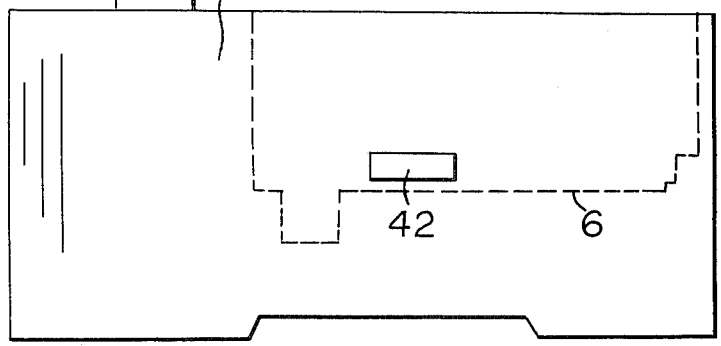
Figure 8:
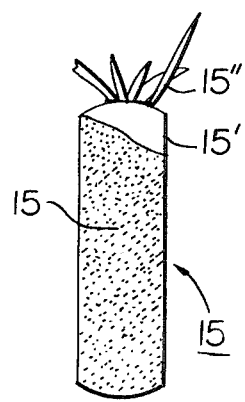
FIGS. 8 and 9 are respectively sectional views of a bag type ion exchange resin layer.

In order to find the limit of the life, it is preferable to provide a monitor window (41) as shown in FIG. 6 wherein the monitor windown (41) is provided at the front cover so as to watch the ion exchange resin layer (15). The deterioration of the ion exchange resin layer (15) is caused from the upper stream side at the inlet to the down stream side to cause useless and accordingly, the position of the monitor window (41) should be able to watch at least the ion exchange resin layer at the down stream side. As shown in FIG. 7, the monitor window (42) is formed at the position corresponding to the monitor window (41), on the side wall of the outer casing covering the misting mechanism (1), the detachable tank (6) and the water feed part (5).

The ion exchange resin layer (15) can be exchanged by taking out the cap (17) screwed on the side wall of the detachable tank (6).

The deterioration of the ion exchange resin layer (15) in the detachable tank (6) is watched through the monitor window (41), (42). When the normal color is imparted, it shows the normal operation.

The ion exchange resin layer (15) can be used for several tens to hundreds times of water feeding into the detachable tank (6). The activity of the ion exchange resin layer (15) is suddenly reduced near the limit. This fact is found by changing the color of the resin. The ion exchange resin layer (15) is exchanged at the limit.

When the monitor windows (42), (41) are respectively formed on the outer casing (18) and the detachable tank (6), the ion exchange resin layer (15) in the detachable tank (6) can be watched to find the limit of the life. The formation of dust or acidic mist or basic mist caused by the humidification under the deterioration of the ion exchange resin layer (15) can be prevented.

In the embodiment of FIG. 3, the monitor window (41) can be formed on the column (21) so as to watch the ion exchange resin layer (15).

It is also possible to use a transparent or translucent container for disposing the ion exchange resin layer (15).

In the present invention, it is preferable to use a bag type ion exchange resin layer (15) which is formed by filling the ion exchange resin (15) in a bag (15') having water permeability, flexibility and water resistance made of glass wool etc. and the opening of the bag (15') is bound with a string (15"). When the bag type ion exchange resin layer (15) is used, the exchange and regeneration of the ion exchange resin are simplified. When the bag (15') is flexible, it can be held in a desired container in a desired shape.

Figure 9:
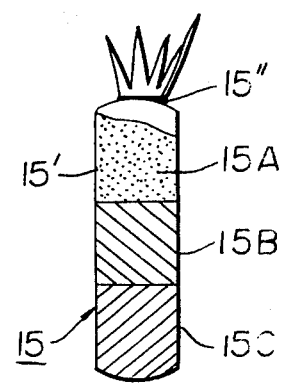

FIG. 9 shows a bag type ion exchange resin layer (15) which contains difference ion exchange resins (15A), (15B), (15C) as separated layers and the opening of the bag (15') is bound with a string (15"). Water containing various impurities can be treated to obtain the deionized water or the pure water by combining two or more kinds of the ion exchange resins.

The opening of the bag (15') can be closed by bonding with a bonding agent or sewing with thread.

Figure 10:
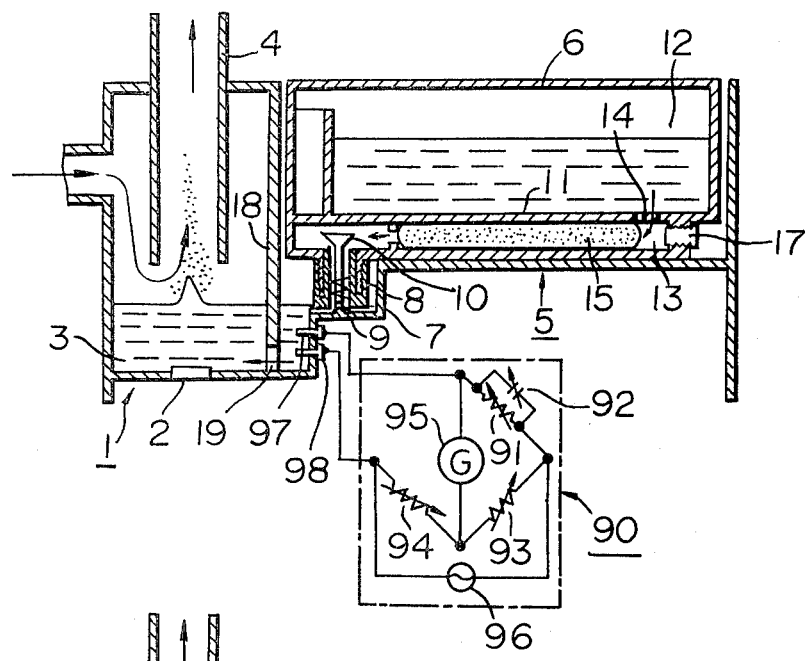
FIGS. 10 to 13 are respectively sectional schematic views of the fourth to seventh embodiments of humidifiers.

FIG. 10 shows the fourth embodiment of the present invention wherein deterioration of the ion exchange resin layer (15) is detected by a detector so as to find the time for exchanging the ion exchange resin layer.

In FIG. 10, the misting mechanism (1) comprises the ultrasonic vibrator (2) the misting container (3) and the mist conduit (4). The water feeder (5) for supplying water to the misting mechanism (1) comprises the detachable tank (6) and the vessel (7). The detachable tank (6) has the opening at the bottom and the plug (8) having the valve is screwed at the opening. In the plug (8) having the valve, the valve (10) is pushed down to be opened by projection (9) formed at the position within the vessel (7) when the detachable tank (6) is disposed at the predetermined position. The partition (11) is formed in the detachable tank (6) to separate the water storage chamber (12) from the thin ion exchange chamber (13)

along the bottom. The water storage chamber (12) is communicated to the ion exchange chamber (13) through the hole (14) formed on the partition (11) and the bag type ion exchange resin layer (15) packed in the water permeable bag is disposed in the ion exchange chamber (13).

The bag type ion exchange resin layer (15) can be exchanged by taking out the cap (17) screwed on the side wall of the ion exchange chamber (13). The vessel (7) is communicated through the hole (19) formed on the partition (18) to the misting container (3).

On the other hand, a pair of electrodes (97), (98) for detecting the electric conductivity of water in the vessel are provided and are connected to an AC bridge (90) as a detection circuit so as to form one side of the AC bridge (90). The other three sides of the AC bridge (90) are formed by a parallel circuit of a varistor (91), a varicon (92); a varistor (93) and a varistor (94). A galvanometer (95) is connected between the electrode (97) and the joint of the varistors (93), (94) and AC power source (96) such as commercial power source AC 100 V is connected between the electrode (98) and the joint of the parallel circuit and the varistor (93).

In the fourth embodiment, when the plug (8) having the valve is taken out and water is poured into the detachable tank (6) and then, the plug (8) is screwed to arrange the tank as shown in FIG. 10, the valve (10) is opened by pushing to pass water from the water storage chamber (12) through the hole (14) into the ion exchange chamber (13) and water is passed through the ion exchange resin layer (15) and the plug (8) into the vessel (7). Thus, water is passed through the hole (19) into the misting container (3) and is misted by the ultrasonic vibrator (2) to discharge the mist through mist conduit (4). In this operation, water fed into the misting container (3) is passed through the ion exchange resin layer (15) whereby most of impurities such as calcium, magnesium and sodium components contained in city water or well water are substantially removed and accordingly, the electric conductivity detected between the electrodes (97), (98) in the vessel (7) is remarkably reduced. The electric conductivity is detected by the AC bridge (90). It is possible to consider no pollution of impurities in a room by humidifying under such condition.

When the activity of the ion exchange resin layer (15) is suddenly reduced, the electric conductivity of water in the vessel (7) is suddenly elevated. This fact is detected by the AC bridge (90) and the ion exchange resin layer (15) is exchanged depending upon the detection.

As described above, in accordance with the fourth embodiment of the present invention, the electric conductivity of water in the vessel (7) can be detected by the AC bridge having electrodes (97), (98) as one side, whereby the life of the ion exchange resin layer (15) can be found without failure. The requirement of exchange of the ion exchange resin layer (15) is informed to prevent the formation of dust or acidic or basic mist caused by humidifying in the deterioration of the ion exchange resin layer (15). The bag type ion exchange resin layer (15) can be easily exchanged by taking out the cap of the detachable tank (6) so as to be suitable for maintenance.

Figure 11:
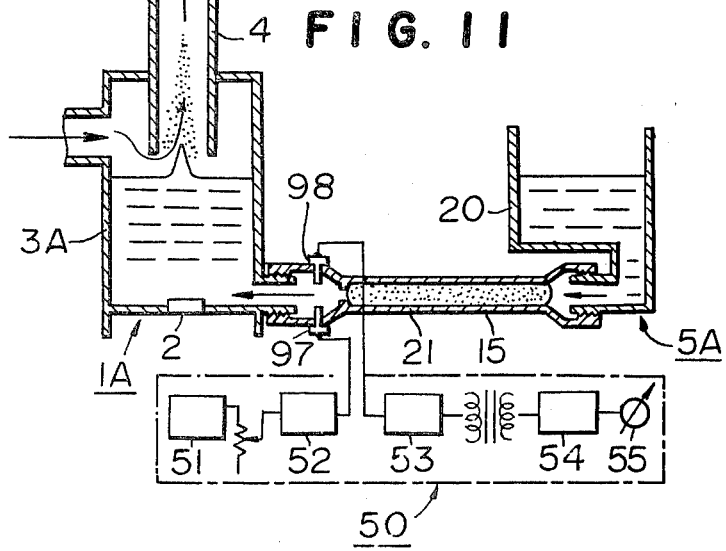

FIG. 11 shows the fifth embodiment wherein the misting mechanism (1A) comprises the ultrasonic vibrator (2), the misting container (3A) and the mist conduit (4). The water feeder (5A) for supplying water to the misting mechanism (1A) comprises the water storage tank (20) and the column (21) for connecting the tank (20) to the misting container (3A). The bag type ion exchange resin layer (15) packed in a water permeable bag is disposed in the column (21). The screw is formed at the end of the column (21) so as to screw the opening the misting container (3A) with the opening of the water storage tank (20).

On the other hand, a pair of electrodes (97), (98) for detecting the electric conductivity of water fed by passing through the ion exchange resin layer (15) are provided on the side wall of the misting container (3A) of the conduit (21). The electrodes (97), (98) are connected to an electric conductivity meter (50) as a detection circuit wherein oscillation output of an oscillation circuit (51) is applied through a buffer amplifier (52) to the electrode (97) and an AC voltage at the electrode (98) given by the electric conductivity of water is amplified by amplifiers (53), (54) and an indicator (55) is driven. The electric conductivity is indicated by the indicator (55).

In the fifth embodiment, the same effect of the fourth embodiment can be attained.

Figure 12:
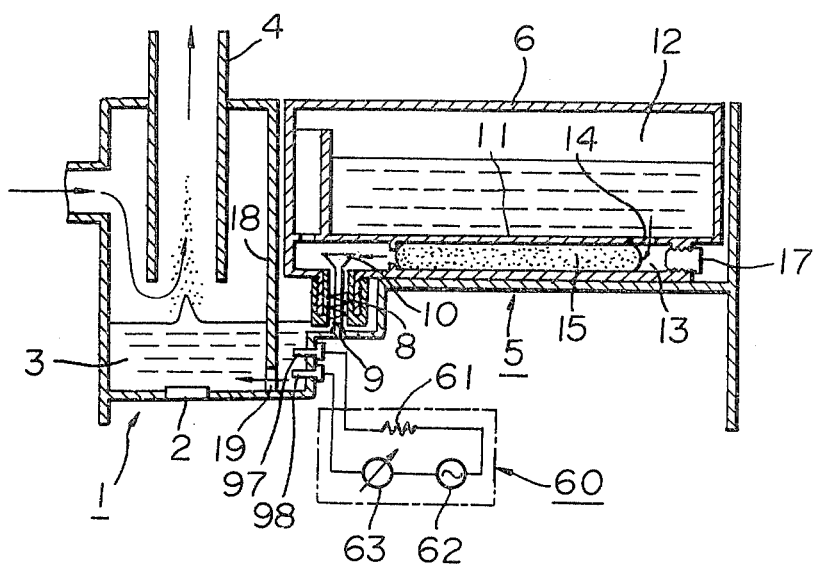

FIG. 12 shows the sixth embodiment of the present invention wherein the structures of the misting mechanism (1) and the water feeder (5) are the same with those of FIG. 10. The detection electrodes (97), (98) on the vessel (7) are connected in the indicator circuit (60) as the detection circuit. The indicator circuit (60) is formed by a serial circuit comprising a resistor (61), an AC power source (62) and an AC current (63). In this embodiment, the current corresponding to the electric conductivity of water in the vessel (7) obtained by passing through the ion exchange resin layer (15) is passed through the AC current meter (63) whereby the electric conductivity can be found by the indicated value.

In accordance with the sixth embodiment, the same effect of the fourth and fifth embodiments can be attained.

Figure 13:
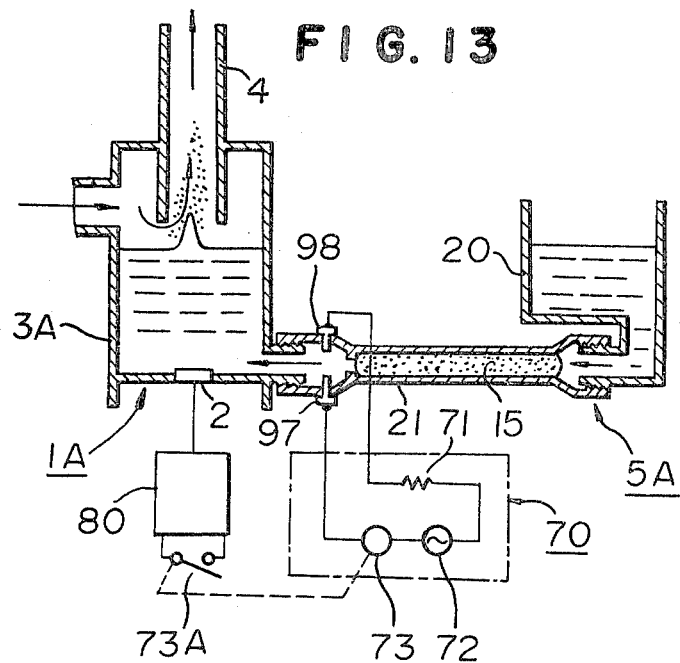

FIG. 13 shows the seventh embodiment wherein the structures of the misting mechanism (1) and the water feeder (5) are the same as those of FIG. 11.

The detection electrodes (97), (98) on the conduit (21) are connected to a relay circuit as a control circuit. The relay circuit (70) is formed by a serial circuit comprising a resistor (71), an AC power source (72) and a relay (73).

A contact (73A) of the relay (73) is connected to a vibrator driving circuit (80) to close it by exciting the relay (73) to stop operation of the vibrator driving circuit (80) of the misting mechanism (1A).

FIG. 14 shows one embodiment of the vibrator driving circuit (80) as a modified Colpitts oscillation circuit. A collector of a transistor (81) is connected through a parallel resonance circuit (82) to a positive side of a DC power source (83) and an emitter is connected through a coil (84) to the negative side of the DC power source (83). A base of the tansistor (81) is connected through a resistor (85) for base-biasing to the positive side of the DC power source and is connected through a capacitor (86) to the negative side of the DC power source. The ultrasonic vibrator (2) is connected between the collector-base of the transistor (81). A series circuit of a resistor (87) having low resistance and the contact (73A) of the relay is connected in parallel to the capacitor (86).

In the seventh embodiment, when the ion exchange resin layer (15) is active in the normal state, the electric conductivity of water obtained by passing through the ion exchange resin layer (15) is low whereby the relay (73) is inactivated to open the contact (73A). Operation of the vibrator driving circuit (80) is not prevented and the normal humidifying operation is carried out. When the life of the ion exchange resin layer (15) is substantially finished, the electric conductivity of water between the electrodes (97), (98) is suddenly elevated, whereby the relay (73) is excited to close the contact (73A). The base circuit of the transistor (81) in the vibrator driving circuit (80) is short-circuited by the resistor (87) having low resistance to stop the operation of the vibrator driving circuit.

In accordance with the seventh embodiment, the operation of the vibrator driving circuit (80) that is the operation of the misting mechanism (1A) is stopped to stop the humidification when the ion exchange resin layer (15) is deteriorated whereby the formation of dust or an acidic mist or basic mist is advantageously prevented without failure.

The position of the ion exchange resin layer can be the other position and is in the passage of water fed to the misting mechanism. As the example, the ultrasonic misting mechanism is shown. Thus, it is possible to apply these embodiment for the spraying mechanism.

In the seventh embodiment, the mechanism for stopping the operation of the vibrator driving circuit (80) by elevating the electric conductivity is shown. If necessary, the mechanism can be released as desired, by connecting a switch. The semiconductor switch can be used instead of the contact of the relay to stop operation of the vibrator driving circuit (80).

In accordance with the embodiments, the ion exchange resin layer is disposed in the humidifier and the detection circuit for indicating the time for the exchange of the ion exchange resin layer or the control circuit is connected thereby providing the humidifier wherein time for the exchange of the ion exchange resin losing the life is indicated and the formation of dust or an acidic mist or basic mist is prevented.

What is claimed as new and desired to be secured by Letters Patent of the United States is:

1. A humidifier, comprising:
    a housing having means defining a misting chamber therein for containing an amount of treated water to be misted;
    a mist conduit extending upwardly from the misting chamber and opening through the top of the housing for discharge of mist from the housing;
    a detachable water storage tank supported in the housing for storing a supply of untreated water to be misted, and having a water outlet;
    said water storage tank having an ion exchange chamber on the bottom thereof with one end in communication with the water outlet from the water storage tank and the other end in communication with the misting chamber, said ion exchange chamber also comprising a water passage for flow of water from the storage tank to the misting chamber;
    a removable ion exchange resin layer in the water passage for treating water flowing therethrough from the storage tank to the misting chamber;
    ultrasonic vibration means in the misting chamber for misting the water therein;
    a transparent viewing window in a wall of the water passage for visual inspection of the resin layer; and
    valve means in said other end of the water passage operable to close when the storage tank is removed from the housing and openable when the storage tank is placed in operative position in the housing, whereby the storage tank may be removed for inspection and servicing of the storage tank and ion exchange chamber.

2. A humidifier according to claim 1 wherein the ion exchange resin layer is packed in a bag having water permeability and flexibility.

3. A humidifier according to claim 1 or 2, wherein;
    a pair of detection electrodes are disposed in water fed through the ion exchange resin layer; and
    a detector circuit means is connected with the electrodes for detecting the electric conductivity of water passing over the electrodes.

4. A humidifier according to claims 1 or 2, wherein;
    a pair of detection electrodes are disposed in water fed through the ion exchange layer;
    a control mechanism is connected with the ultrasonic vibration means for controlling operation of the vibration means; and
    control circuit means is connected with the electrodes and with the control mechanism for controlling operation of the ultrasonic vibration means dependent upon a condition sensed by the electrodes.

5. A humidifier according to claims 1 or 2, wherein:
    the ion exchange chamber has an opening in one end thereof; and
    a removable plug is inserted into the opening to close the opening but is removable therefrom to enable access to the ion exchange resin layer.

6. A humidifier according to claims 1 or 2, wherein:
    the ultrasonic vibration means is mounted in a bottom wall portion of the housing at the bottom of the misting chamber.

* * * * *